(12) United States Patent
Matzan

(10) Patent No.: US 7,213,789 B1
(45) Date of Patent: May 8, 2007

(54) SYSTEM FOR DETECTION OF DEFECTS IN RAILROAD CAR WHEELS

(76) Inventor: Eugene Matzan, 2187 N. Washington St., Rochester, NY (US) 14625

(*) Notice: Subject to any disclaimer, the term of this patent is extended or adjusted under 35 U.S.C. 154(b) by 0 days.

(21) Appl. No.: 10/772,535

(22) Filed: Feb. 6, 2004

Related U.S. Application Data

(60) Provisional application No. 60/466,241, filed on Apr. 29, 2003.

(51) Int. Cl.
*B61K 9/00* (2006.01)

(52) U.S. Cl. .............................. 246/169 S; 246/169 R

(58) Field of Classification Search ............ 246/169 R, 246/122 R, 120, 121, 169 S; 73/593, 104, 73/105, 579, 580, 581
See application file for complete search history.

(56) References Cited

U.S. PATENT DOCUMENTS

| | | | | |
|---|---|---|---|---|
| 2,160,540 A | * | 5/1939 | Drake | 324/718 |
| 4,702,104 A | * | 10/1987 | Hallberg | 73/146 |
| 4,936,529 A | * | 6/1990 | Maine | 246/169 R |
| 6,138,515 A | * | 10/2000 | Moufle et al. | 73/639 |
| 6,523,411 B1 | * | 2/2003 | Mian et al. | 73/620 |

FOREIGN PATENT DOCUMENTS

GB 2233761 A * 1/1991

* cited by examiner

*Primary Examiner*—Mark T. Le
(74) *Attorney, Agent, or Firm*—M. Lukacher, Esq.

(57) ABSTRACT

A system for automatic detection of defects in railroad wheels, a system that is stationary and is installed in extended intervals in the rails uses stationary acoustical/vibration sensors installed at intervals in the rails. Rail segments associated with the detectors are acoustically isolated. The sensors acquire the sounds and vibrations generated by the wheels rolling over the rails. Signal analyzers identify rail defects from intensity vs. frequency distributions of acoustical spectra. Such spectra reflect the condition of the wheels and change their intensity vs. frequency distributions when the wheels pass the sensors installed in the rails. The acquired information on the condition of the wheels is transmitted to a central location. Any defective wheel is identified and marked for repair or replacement.

18 Claims, 4 Drawing Sheets

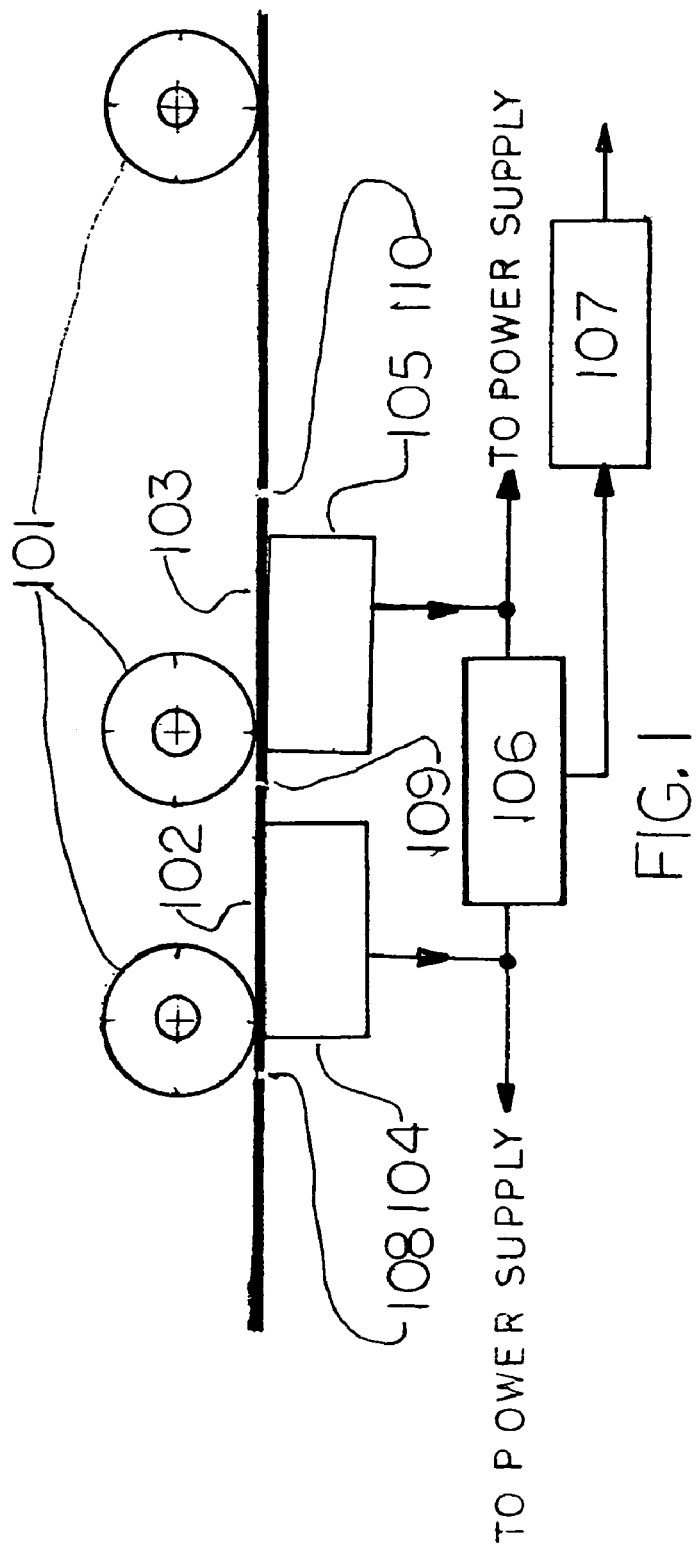

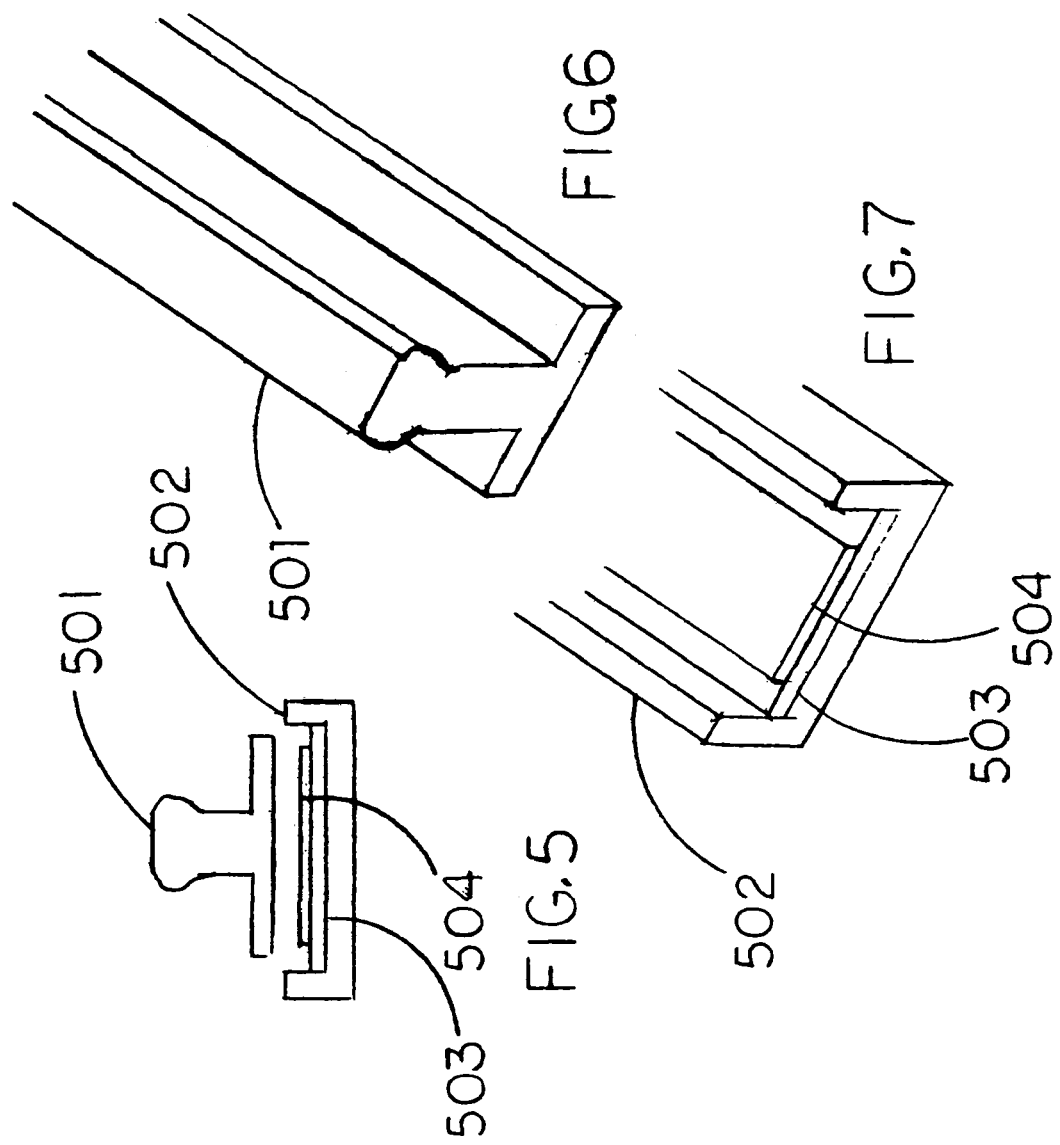

SYSTEM FOR DETECTION OF DEFECTS IN RAILROAD CAR WHEELS

This application claims priority to my provisional application No. 60/466,241 filed Apr. 29, 2003

The present invention relates to a system for detection of railroad and wheel defects wherein rail defect monitors are installed in a segment of the rails in acoustically isolated relationship provide information identifying wheels with defects, if desired, from the remote locations of the monitors to a central monitoring station.

BACKGROUND OF THE INVENTION

Railroads are important transportation systems for moving passengers and freight. The railroad car wheels are subject to wear and to damage due to material defects, and even sabotage. Many defects worsen gradually and, if detected early, can be repaired or replaced before accidents occur.

An automatic system for detection of such defects, aside of its value as a means for preventing accidents, injuries and deaths, would also allow for train maintenance schedule to be done as indicated by the condition of the wheels, rather than just based on past experience or regulations—an opportunity for cost-saving.

The advent of inexpensive and reliable sensors, microprocessors and electronics makes such automated systems practical and cost-effective.

SUMMARY OF THE INVENTION

The invention described here for automated detection of railroad car wheel defects has advantages over prior art in that it is not affected by electro-magnetic interference, can be conveniently retrofitted to the existing rails, and will sense and report a wide range of different defects and the location of the wheels so affected.

The system uses analysis of the acoustical spectrum of sounds generated by the rolling train wheels. The harmonics content in such spectrum changes as a defective wheel rolls over a rail segment equipped with and acoustic or vibration sensors. The intensity distribution of the harmonics is related to the nature and the extent of a defect, hence spectral analysis will reveal the nature and the severity of a defect.

In the preferred embodiment of this invention one or more acoustically isolated rail segments are installed into both rails. Each such segment is equipped with an acoustical/vibration transducer capable of picking up any sounds or vibrations as wheel rolls over this segment or segments. The length of each such rail segment is such that it can monitor a wheel through about one half of its full rotation and the following rail segment would monitor the second half. In this manner only one wheel can be rolling over the rail segments at one time, preventing signal interference.

A defective wheel generates sounds or causes vibrations that are distinctly different from sounds or vibrations generated by wheels without defects. Since one can expect the sounds or vibrations to be cyclic, the difference is in the intensity distribution of the harmonic content that can be conveniently analyzed using Fast Fourier Transform to obtain the frequency distribution of these harmonics and then to compare it reference signal patterns stored in the detection system. If the comparison indicates that the defect or wear is severe enough for the wheel to be replaced, and appropriate signal indicating the position of the wheel in the train and, possibly, the nature of the defect is transmitted to a central location.

Alternately, the detection system could be equipped with a paint sprayer that would upon the appropriate system spray the suspected wheel to mark it for further inspection and, if necessary, replacement.

BRIEF DESCRIPTION OF THE DRAWINGS

FIG. 1 is a schematic diagram of the stationary defect detection system to be installed in the rails.

FIGS. 2A and 2B are top views of the two of the alternatives for the acoustical gap in the rails, which would minimize the wear of the rails FIG. 5 depicts an alternative installation of sensors in the rail sections for sensing FIG. 6 shows in perspective a fragment of the rail section to be inserted in FIG. 5

FIG. 7 is perspective view of a segment of a channel structure used to join the sensing rail section of FIG. 5 with the rest of the track.

DESCRIPTION OF THE PREFERRED EMBODIMENTS

Figure 3:
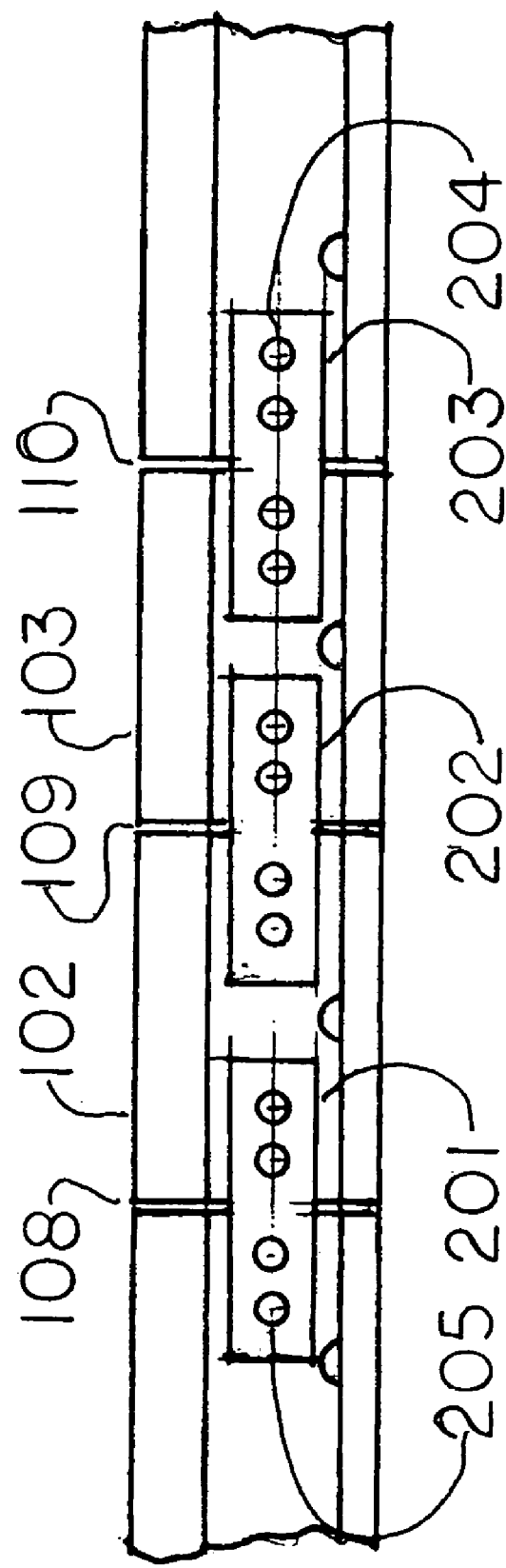
FIG. 3 is a side view of the rail segments used for detection of wheel defects

Referring now to FIG. 1, which is a schematic diagram of the wheel defect detection system, 102 and 103 are the rail segments. The train wheels are 101, 104 and 105 are the acoustical/vibration sensors conveniently attached to the rail segments 102 and 103, respectively. These sensors pick the sounds and vibrations generated when the train wheels rolls over the rails. The intensity vs. frequency distribution of these sounds/vibrations is defined by the speed of the train the condition of the rail and wheels surfaces and of the joints between the rails. Any anomalies in the rails produce a significant change in the sound/vibration spectrum, such as when a wheel is out of round. The sounds and vibrations propagate through the rail segments 102 and 103 to one of the sensors 104 or 105, which also include amplifiers.

The electrical signals corresponding to sounds/vibrations picked up by sensors 104 and/or 105 are amplified and fed into module 106 which contains an integrated acoustical spectrum analyzer that uses the Fast Fourier Transform algorithm to perform the conversion of the signals from time domain into frequency domain and thus generate an intensity vs. frequency distribution. Since more than a pair of sensors may be used along the rail line to detect wheel defect, each sensor also transmits an I.D. code to identify its location.

The information processed in the Fast Fourier Transform section of the module 106 is fed into a microprocessor in the same module, which compares the received spectrum data to a stored reference spectrum representing defect-free wheels and isolates the changes. These changes are then used in the microprocessor to determine the nature of the defect and its extent with reference to stored data on all typical defects and anomalies. The resulting diagnosis data are then sent via transmitter 107 to a central monitoring station. Alternately, the data could be transmitted over a wire. To identify the defective wheel, the system is equipped with a counter that counts the number of wheels passing over the rail segments from the first wheel in the locomotive to the defective wheel or wheels in the train.

Instead of sending information to the central monitoring station, the signal indicating the presence of a defective wheel can also be used to trigger a paint sprayer that would mark the defective wheel for further inspection and, if need be, replacement at a repair facility.

FIGS. 2A and 2B are the top views of the acoustic gaps associated with the rail segments that are equipped with sound/vibration sensors. The shape of the gaps is designed to reduce rail wear at these points. It is to be understood that other shapes of acoustic gaps intended to achieve the same effect are within the scope of this invention.

FIG. 3 illustrates the side view of the rail segments 102 and 103 and the acoustic gaps 108, 109, and 110. Flanges 201, 202, and 203 are used to join the rail segments into the rail line. To minimize the transmission of the sound/vibrations between the rail segments and the rail line, the fasteners 204, have associated with them cylindrical inserts made of a hard material, such as a fiber-reinforced polymer, which is a poor conductor of higher frequency sounds/vibration associated with defective wheels.

Figure 4:
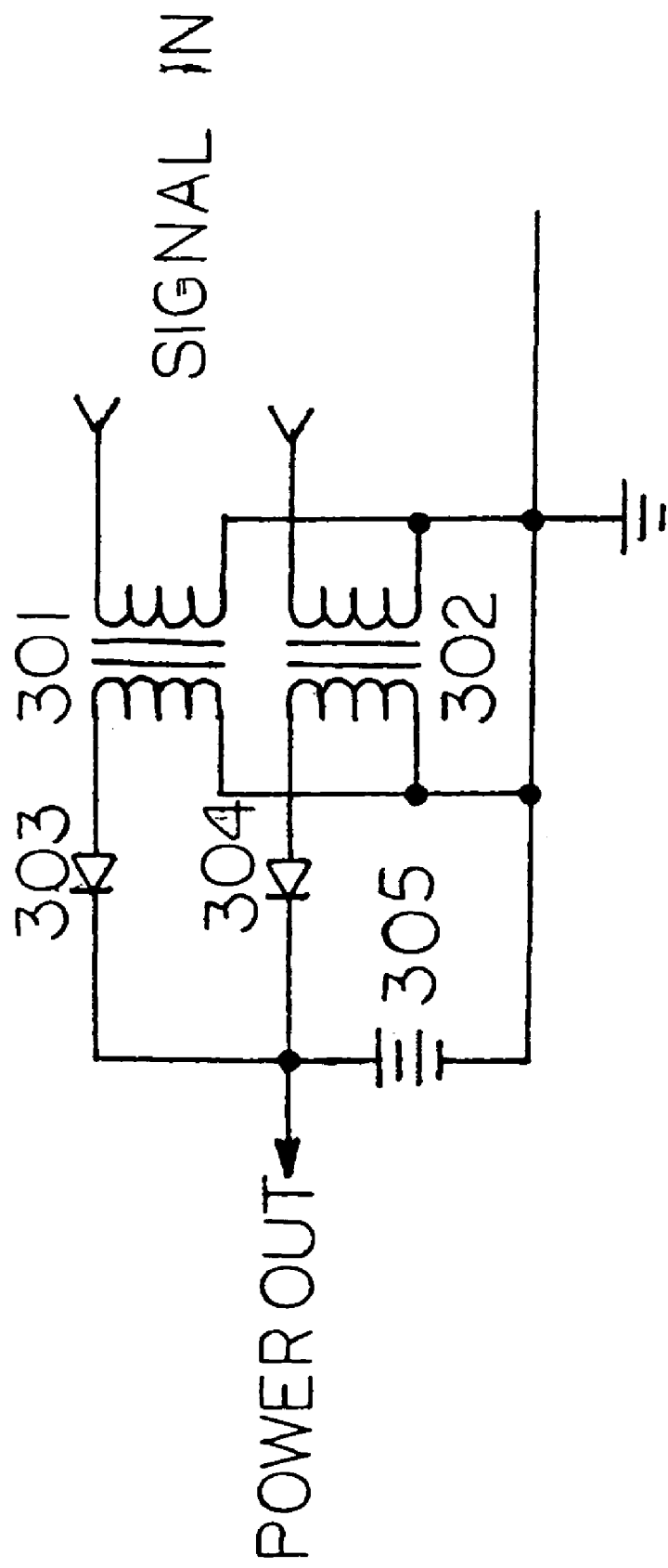
FIG. 4 is a schematic diagram of one version of the power supply

The system depicted in FIG. 1 may be self-powered or powered by a long-lasting battery The power is generated as follows: Whenever a train travels over rails where sensors 104 and 105 are located, each passing wheel generates vibrations and sound, which are transducted by the sensors into electrical signals, amplified and fed into a pair of isolating transformers 301 and 302 as shown in FIG. 4. These transformers are preferably high-frequency units using toroidal cores. The signals are rectified by diodes 303 and 304. The resulting direct current charges the battery 305, which provides the power for the system, where the power is provided by a primary, long lasting battery, such as a lithium battery. The battery is periodically replaced or recharged.

FIGS. 5, 6 and 7 illustrate an alternative arrangement for inserting a rail section equipped with a vibration/acoustic sensor into the rail track. A section of a channel 502 is used to join the rails. The channel 502 has on the bottom a layer of sound/vibration isolating material 503 and the sensor 504. It should be understood that the method of joining depicted in FIGS. 5, 6 and 7 may be combined with rail configurations of FIGS. 2A and 2B to minimize the wear of the rails.

Since the defect detection system is stationary installed at a known location, it can be uniquely identified when transmitting a warning signal by an appropriate fixed code.

I claim:

1. A system for detection of railroad wheel defects comprising remote railroad wheels defect monitors installed in rails over which the wheels travel, said remote railroad wheels defect monitors comprising:

first and second succeeding acoustically isolated rail sections each of a length about one half the distance over which a full rotation of the railroad wheel travels, each equipped with an acoustical/vibration sensor, two for each rail, to define successive remote monitoring locations, said sensors being operative respond to sounds/vibrations generated when train wheels are rolling on said rail segments;

said sensors being operative to generate specific electrical signals over the entire acoustical range of said sounds/vibrations thereby representing the nature and extent of said defects said specific electrical signals differing in their parameters from the electrical signals generated when said wheels roll over said rail sections are free from any defects; and means to amplify said electrical signals generated by said sensors over said entire acoustical range in response to sounds and vibrations made train wheels rolling over said rails;

and means for obtaining wheel identification and defect information from the monitors comprising first computing means to analyze said amplified electrical signals by transforming said signals from time into frequency domain and generating a signal intensity vs. frequency spectra;

second computing means to accept said spectra and compare said spectra to first reference spectra stored in said computing means to indicate the absence/presence of the wheel defects; and means to determine the location of any detected defect in said wheels.

2. The system per claim 1 comprising means for transmitting the collected data from said computing means on the nature, the extent and the location of said defects; means for uniquely identifying the identity of the remote defect monitoring location, when said defect is first detected.

3. A system per claim 1 in which said central monitoring station has means which receive the information from said remote rail defect monitors and generates reports and warnings related to the condition of said wheels.

4. A system per claim 1, in which the first computing means uses a fast Fourier transform to perform said conversion of said signals from time domain to frequency domain, thus generating sound/vibrations intensity vs. frequency spectra.

5. A system per claim 4 in which said second computing means are used to accept said spectra, compute the differences of said spectra to said first stored reference spectra and identify the nature and the extent of a defect in said wheels by comparing said difference with stored second reference spectra, said stored second reference spectra being representative of said defects in said wheels.

6. A system per claim 1 in which the functions of said first computing means is incorporated into said second computing means.

7. A system per claim 1 in which said sensors are stationary and are attached to said rails separately in each said section.

8. A system per claim 2 wherein said identifying means being responsive to said electrical signals for detecting the instant when said wheels pass over the location of said sensors.

9. A system per claim 2 wherein said identifying means include means for detecting the instant when said wheels pass the location of said sensors which include strain gauges.

10. A system per claim 2 in which said identifying means include means for detecting the instant when said wheels pass over the location of said sensors which include pressure sensors.

11. A system per claim 2 in which said identifying means include means for detecting the instant when said wheels pass the location of said sensors include magnetic sensors.

12. A system per claim 2 wherein the identifying means includes means responsive to said electrical signals for counting the number of wheels passing over said rail sections.

13. A system per claim 2 in which said transmitting means transmit said collected data pertaining to detected defects to said central monitoring station.

14. A system per claim 1, which includes power supply means utilizing said electrical signals from said sensors for generating and storing electrical energy for operating said wheel identification and defect information obtaining means.

15. A system per claim 14, in which said electrical signals generated in response to said sounds and vibrations to generate electrical current, including current stored as an electrical charge in a storage battery.

16. A system per claim 1 in which said rail sections are inserted into said rails and joined to said rails by means of a channel structures.

17. A system per claim 16 in which said channel structures contain sound isolating material that prevents the sounds from adjoining rail to be passed into said rail sections.

18. A system per claim 17 in which said channel structures are equipped with said sensors.

* * * * *